(12) United States Patent
Vantrease

(10) Patent No.: US 9,238,325 B2
(45) Date of Patent: Jan. 19, 2016

(54) THERMOFORMING MACHINE, PLUG ASSIST DRIVE ASSEMBLY AND METHOD

(75) Inventor: Dale L. Vantrease, Naches, WA (US)

(73) Assignee: Irwin Research and Development, Inc., Yakima, WA (US)

( * ) Notice: Subject to any disclaimer, the term of this patent is extended or adjusted under 35 U.S.C. 154(b) by 620 days.

(21) Appl. No.: 13/223,032

(22) Filed: Aug. 31, 2011

(65) Prior Publication Data

US 2013/0049242 A1    Feb. 28, 2013

(51) Int. Cl.
*B29C 51/38*    (2006.01)
*B29C 51/08*    (2006.01)

(52) U.S. Cl.
CPC .............. *B29C 51/38* (2013.01); *B29C 51/082* (2013.01)

(58) Field of Classification Search
CPC ........................................................ B29C 51/38
See application file for complete search history.

(56) References Cited

U.S. PATENT DOCUMENTS

| | | | |
|---|---|---|---|
| RE27,137 E * | 6/1971 | Brown et al. ........... | B29C 51/04 425/149 |
| 4,464,329 A * | 8/1984 | Whiteside ............... | B29C 51/04 264/544 |
| 4,878,826 A * | 11/1989 | Wendt ..................... | B29C 51/04 264/322 |
| 5,002,479 A | 3/1991 | Brown | |
| 5,199,340 A | 4/1993 | Lamson | |
| 5,225,213 A | 7/1993 | Brown | |
| 5,234,332 A | 8/1993 | Hoenke | |
| 5,976,452 A | 11/1999 | Meyer | |
| 6,648,624 B1 | 11/2003 | Foor | |
| 6,749,418 B2 * | 6/2004 | Muirhead ......... | B29C 66/83221 425/183 |
| 6,969,246 B1 * | 11/2005 | Kundinger et al. ........... | 425/515 |
| 7,033,536 B2 * | 4/2006 | Martin .................... | B29C 51/04 264/549 |
| 7,399,175 B2 | 7/2008 | Arends | |
| 7,559,759 B2 | 7/2009 | Vantrease | |
| 7,628,950 B2 | 12/2009 | Hansen | |
| 2002/0058082 A1 * | 5/2002 | Muirhead ......... | B29C 66/83221 425/384 |
| 2003/0090042 A1 * | 5/2003 | Sevigny ................ | B29C 33/302 264/554 |
| 2004/0113329 A1 * | 6/2004 | Martin .................... | B29C 51/04 264/547 |

\* cited by examiner

*Primary Examiner* — Ryan Ochylski
(74) *Attorney, Agent, or Firm* — Wells St. John P.S.

(57) ABSTRACT

A plug assist drive assembly is provided for a thermoforming press. The plug assist drive assembly includes a drive platen, a plug assist platen, a first elongated gear rack, a second elongated gear rack, a drive gear, a driven gear, and a drive source. The first elongated gear rack and the second elongated gear rack are carried by the plug assist platen in longitudinally extending and substantially parallel, spaced apart relation with a plurality of rack teeth extending on each gear rack between proximal and distal ends. The drive gear is carried by the drive platen and is operably communicating with the first elongated gear rack. The driven gear is carried by the drive platen and is operably communicating with the second elongated gear rack and the drive gear. The drive source is operably communicating with the drive gear to drive the assist platen in linearly reciprocating motion relative to the drive platen. A thermoforming machine having the plug assist drive assembly is also provided. A method is also provided.

21 Claims, 10 Drawing Sheets

THERMOFORMING MACHINE, PLUG ASSIST DRIVE ASSEMBLY AND METHOD

TECHNICAL FIELD

The disclosed embodiments pertain generally to thermoforming apparatus. More particularly, the disclosed embodiments relate to drive mechanisms for advancing plug assists, or male dies into female mold cavities to help stretch material into conformity with the mold cavity walls during a thermoforming operation.

BACKGROUND OF THE INVENTION

The use of a third platen on a thermoforming machine is known in order to more quickly advance an array of plugs into female mold cavities of a thermoforming machine. One machine uses a plurality of ball screws. Another machine uses a single roller screw shaft. Both machines provide a compromise between providing sufficient torque, or forming pressure, and providing a sufficiently fast stroke. Improvements are needed in order to provide both sufficient torque and sufficiently fast stroke in order to optimize article formation and surface finish.

SUMMARY OF THE INVENTION

A third motion platen is driven for movement relative to one of a pair of platens on a thermoforming machine to provide quick movement of plugs in combination with relatively high forming pressures on the thermoforming machine as the plugs move into mold cavities during a thermoforming operation.

According to one aspect, a plug assist drive assembly is provided for a thermoforming press. The plug assist drive assembly includes a drive platen, a plug assist platen, a first elongated gear rack, a second elongated gear rack, a drive gear, a driven gear, and a drive source. The first elongated gear rack and the second elongated gear rack are carried by the plug assist platen in longitudinally extending and substantially parallel, spaced apart relation with a plurality of rack teeth extending on each gear rack between proximal and distal ends. The drive gear is carried by the drive platen and is operably communicating with the first elongated gear rack. The driven gear is carried by the drive platen and is operably communicating with the second elongated gear rack and the drive gear. The drive source is operably communicating with the drive gear to drive the assist platen in linearly reciprocating motion relative to the drive platen.

According to another aspect, a thermoforming machine is provided having a frame, a first platen, a second platen, a plug assist platen, a first elongated gear rack, a second elongated gear rack, a drive gear, a driven gear, and a drive source. The first platen is supported by the frame and is operative to carry a female die. The second platen is supported by the frame for movement to and fro relative to the first platen. The plug assist platen is carried relative to the second platen and is operative to carry a plug for complementary interaction with the female die. The first elongated gear rack and the second elongated gear rack are carried by the plug assist platen in longitudinally extending and substantially parallel, spaced apart relation, or equi-spaced apart relation, with a plurality of rack teeth extending on each gear rack between proximal and distal ends. The drive gear is carried by the drive platen and is operably communicating with the first elongated gear rack. The driven gear is carried by the drive platen and is operably communicating with the second elongated gear rack and the drive gear. The drive source is carried by the second platen and is operably communicating with the drive gear to drive the assist platen in linearly reciprocating motion relative to the drive platen.

According to yet another aspect, a method is provided for forming an article in a thermoformable web. The method includes: providing a thermoforming machine with a first platen, a second platen, a third motion platen having a plug, and a drive source having a drive motor, a bevel gearbox, a pair of elongated gear racks coupled to the third motion platen and a pair of gears operably communicating together, with each gear cooperating with a respective one of the elongated gear racks to impart linear reciprocation to the gear racks and the third motion platen from the motor through the gearbox; presenting the first platen proximate a heated thermoformable web; moving the second platen toward the web; and driving the gears in co-rotation with the drive motor through the gearbox to raise the elongated gear racks, the third motion platen, and the plug relative to the second platen to drive the plug into the heated thermoformable web.

BRIEF DESCRIPTION OF THE DRAWINGS

Preferred embodiments of the disclosure are described below with reference to the following accompanying drawings.

DETAILED DESCRIPTION OF THE PREFERRED EMBODIMENTS

This disclosure is submitted in furtherance of the constitutional purposes of the U.S. Patent Laws "to promote the progress of science and useful arts" (Article 1, Section 8).

As used herein, the term "co-rotation" is understood to mean the action or process of rotating jointly through operable communication, as with another rotating object or field, and includes counter-rotation, as well as rotation of two objects in the same direction.

Figure 1:
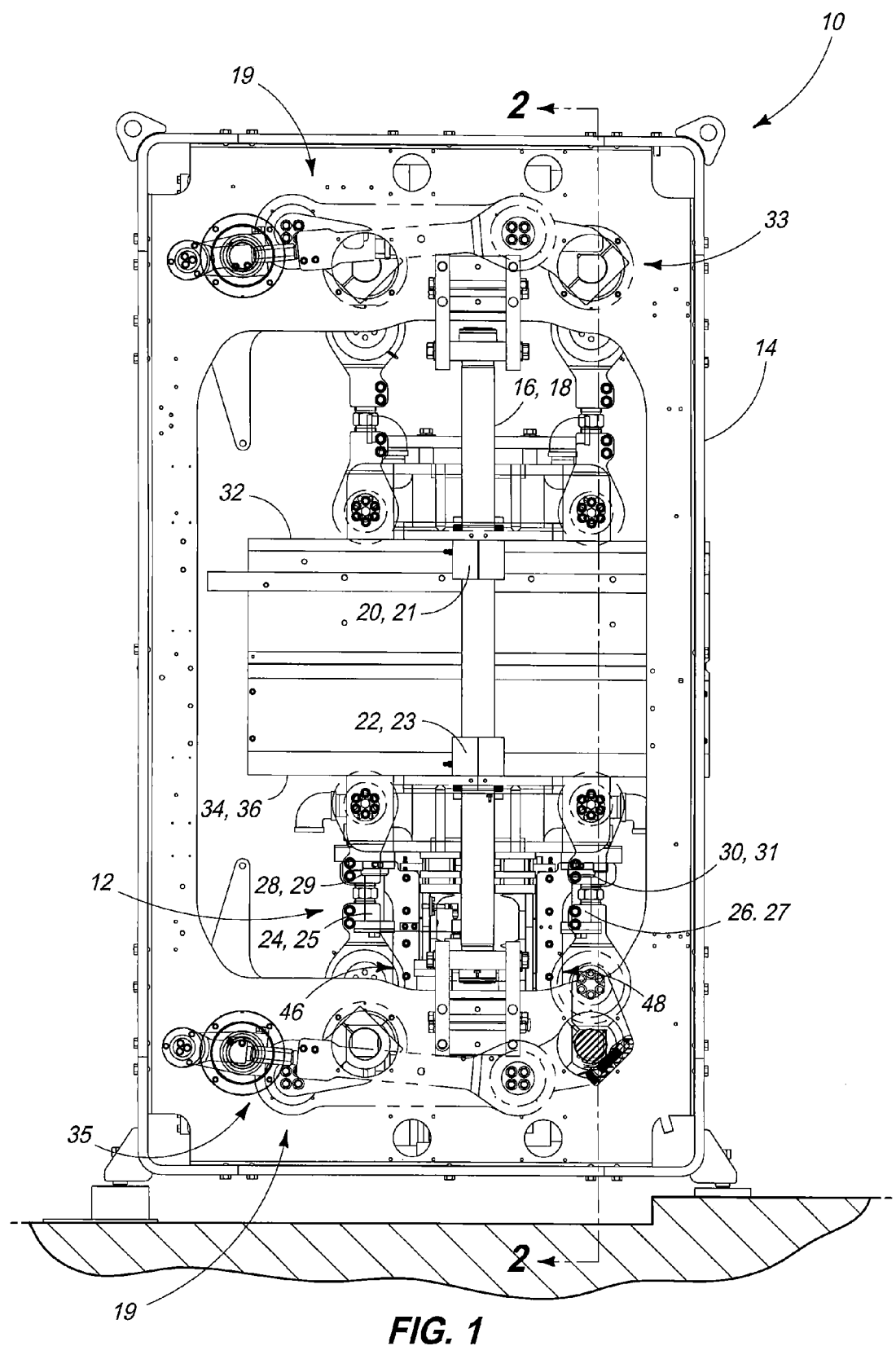
FIG. 1 is a side elevational view of a thermoforming machine with a third motion plug assist drive assembly in accordance with an embodiment.
Figure 2:
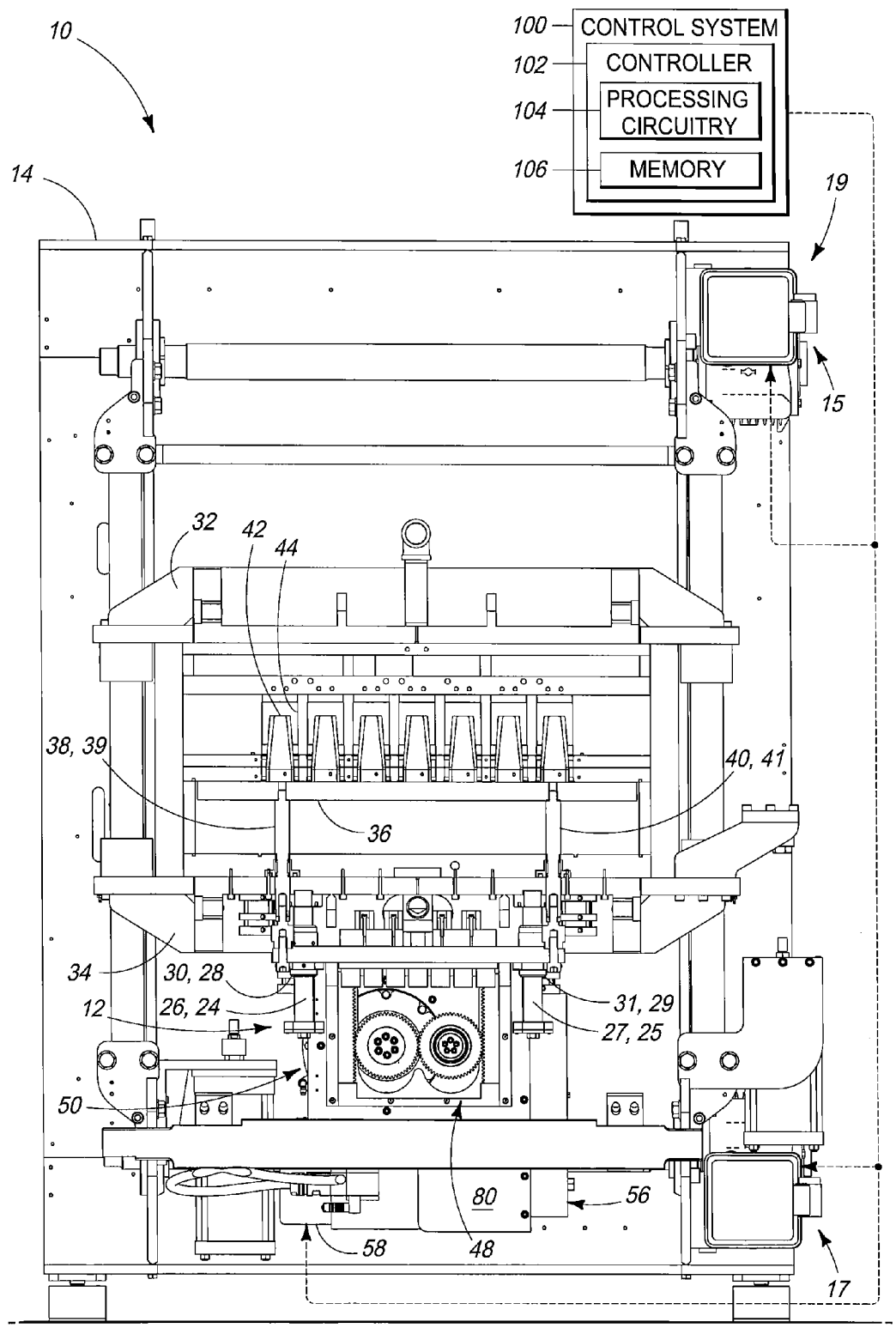
FIG. 2 is a vertical sectional view taken along line 2-2 of FIG. 1.

Attention is now directed towards embodiments of the device. FIGS. 1 and 2 are front and side elevational views illustrating a thermoforming machine 10 with a third motion plug assist drive assembly, or tooling assembly 12 in accordance with an embodiment. More particularly, thermoforming machine 10 includes a structural frame 14, stationary die posts 16 and 18 supported by frame 14, an upper platen 32, and a lower platen 34. Upper platen 32 and lower platen 34 are supported for vertical reciprocation via pairs of respective bronze bushings 20, 21 and 22, 23, respectively. A kinematic drive linkage 19 drives upper platen 32 and lower platen 23 using upper kinematic linkage assembly 33 and lower kinematic linkage assembly 35, respectively, each driven by a respective servo motor 15 and 17 (see FIG. 2). A third motion platen, or assist platen 36 is supported for movement relative to lower platen 34 by bushings 28-31 which slide over respective die posts 24-27.

As shown in FIG. 2, third motion platen 36 is carried for reciprocating movement relative to lower platen 34 on an array of drive shafts 38-41. Drive shafts 39 and 41 are driven by a drive assembly 46 (see FIG. 1), while drive shafts 38 and 40 are driven by another drive assembly 48. A servo motor 58 drives drive assemblies 46 and 48 (see FIG. 1) through a bevel gearbox 52 (see FIG. 3) to provide a drive source 50 (see FIG. 2). Drive source 50 operably communicates with the drive assemblies 46 and 48 through gearbox 52 to drive the assist platen 36 in linearly reciprocating motion relative to the drive platen 34. According to one construction, bevel gearbox 52 is a Hub City Model 950 gearbox.

As shown in FIG. 1, upper kinematic linkage assembly 33 and lower kinematic linkage assembly 35 of kinematic drive linkage 19 cooperate to drive upper and lower platens 32 and 34, respectively. Respective modern rotary electric servo drive motors 15 and 17 (see FIG. 2) independently drive linkages 33, 35 and platens 32, 34 respectively. Such motors are driven by a computer control system 100 (see FIG. 2), as is presently understood in the art. Other kinematic linkages and drive motor arrangements can be used in the alternative.

More particularly, kinematic linkages 33 and 35 of FIG. 1 each comprise drive linkages that are formed from a pair of top and bottom crank arm assemblies, respectively. Each assembly is formed from a crank arm linkage and a four-bar linkage. The crank arm linkage drives the four-bar linkage in an oscillating motion. Each platen 32 and 34 is driven by kinematic linkage 33 and 35, respectively, in substantially non-rotating linear, vertical motion. Guide posts 16 and 18 further limit such motion to vertical reciprocating motion. Kinematic linkages 33 and 35 are driven by servo drive motors 15 and 17 (see FIG. 2). This action causes coacting engagement of female cavities, or female dies 44 on the upper platen with mating male dies or plugs 42 on opposed sides of thermoformable web, or sheet 112 (see FIG. 7).

More particularly, each drive system, including the motor and associated drive controller, forms the motor of an associated rotary press. This rotary press attaches to a rotating crank arm assembly that moves the associated four-bar linkage. The linkage causes the attached platen to move up and down in response to rotation of the drive. Accordingly, a single revolution of drive motors 15 and 17 will produce a corresponding complete press cycle of both the upper and lower platens, respectively. Hence, a complete cycle of each drive will return the press to a starting, or closed position. For example, when lower drive motor 17 is at an initial rotated position of zero degrees, the lower platen 34 is closed, or upwardly raised against the thermoformable sheet, or web. Similarly, when lower driven motor 17 is rotated to 180 degrees, the lower platen 34 is lowered, or completely opened. Likewise, the same holds true for upper drive motor 15 and upper platen 32.

FIG. 2 illustrates a control system 100 configured to move upper platen 32, lower platen 34, and third motion, or plug assist platen 36 via respective servo motors 15, 17 and 58. According to one construction, upper platen 32 and lower platen 34 are each drive platens, and plug assist platen 36 is also a moving platen. Control system 100 includes a controller 102 comprising processing circuitry 104 and memory 106 configured to precisely regulate motion of platens 32, 34 and 36 in desired, timed synchronization such that individual plugs, or male dies 42 are driven upwardly with a greater combination of speed and force than would be capable by merely moving platens 32 and 34 together. In operation, platens 32 and 34 are driven together into a heated web of thermoformable material that is captured between upper platen 32 and lower platen 34 during a thermoforming operation. Third motion platen 36 is subsequently moved upwardly relative to moving platen 34 so as to cause forming of a thermoformed article in a heated plastic web between each individual pair of complementary male plugs 42 and female die cavities 44. As shown, several rows of complementary, interacting male plugs 42 and female die cavities 44 are provided in platens 36 and 32, respectively. Subsequently, platens 32, 34 and 36 are withdrawn, or retracted apart in order to start the cycle all over again, and third motion platen 36 is lowered relative to lower platen 34. The cyclical process is then repeated.

Preferably, a modern rotary electric servo drive motor, or actuating device, is used for drive motors 15 and 17 (see FIG. 2). Such a drive includes an AC servo motor and an associated servo drive motor controller. For example, one suitable AC motor is sold by Siemens AG, Automation Group, Automation Systems for Machine Tools, Robots and Special-Purpose Machines, P.O. Box 31 AD, D-91050, Erlangen, Federal Republic of Germany. Additionally, one suitable servo drive motor controller is sold by Siemens as an analog feed drive system including the SIMO DRIVE 611-A Transistor PWM Inverters and Motors for AC FV Drives. Such a drive will provide a predictable motor device that can very accurately position a machine element to a desired position at a given time. Accordingly, the associated servo motor is a brushless servo motor. Using suitable control software, activation of associated machine components can also be triggered based on velocity or position of a drive, by using a velocity profile or an integrated displacement of the drive. Furthermore, one suitable servo drive motor used for servo drive motor 58 is also a Siemens AC servo motor, model number 1FT5132-OSC71-1-ZH27, also available from Siemens AG._Automation Group, Automation Systems for Machine Tools, Robots and Special-Purpose Machines, P.O. Box 31 AD, D-91050, Erlangen, Federal Republic of Germany.

As shown in FIG. 2, plug assist drive assembly 12 reciprocates third motion platen 36 up and down relative to lower platen 34. Platen 36 is guided for axial reciprocation by a rectangular array of bronze bushings 28-31, each contained within a housing, that are slidably received over respective cylindrical die posts 24-27 mounted rigidly to lower platen 34. Optionally, plug assist drive assembly can be mounted to upper platen 32, with the third motion platen being driven in a downward direction while the upper platen is being driven downwardly. Further optionally, a third motion platen can be mounted to a stationary platen, when an opposing platen is moved to and fro. Further optionally, a third motion platen can be mounted for horizontal movement relative to a moving platen from a pair of opposed moving platens that move together and apart along a horizontal direction. Finally, a third motion platen can be affixed to any one of a pair of platens that move together and apart along a contact plane in any angular orientation.

Figure 3:
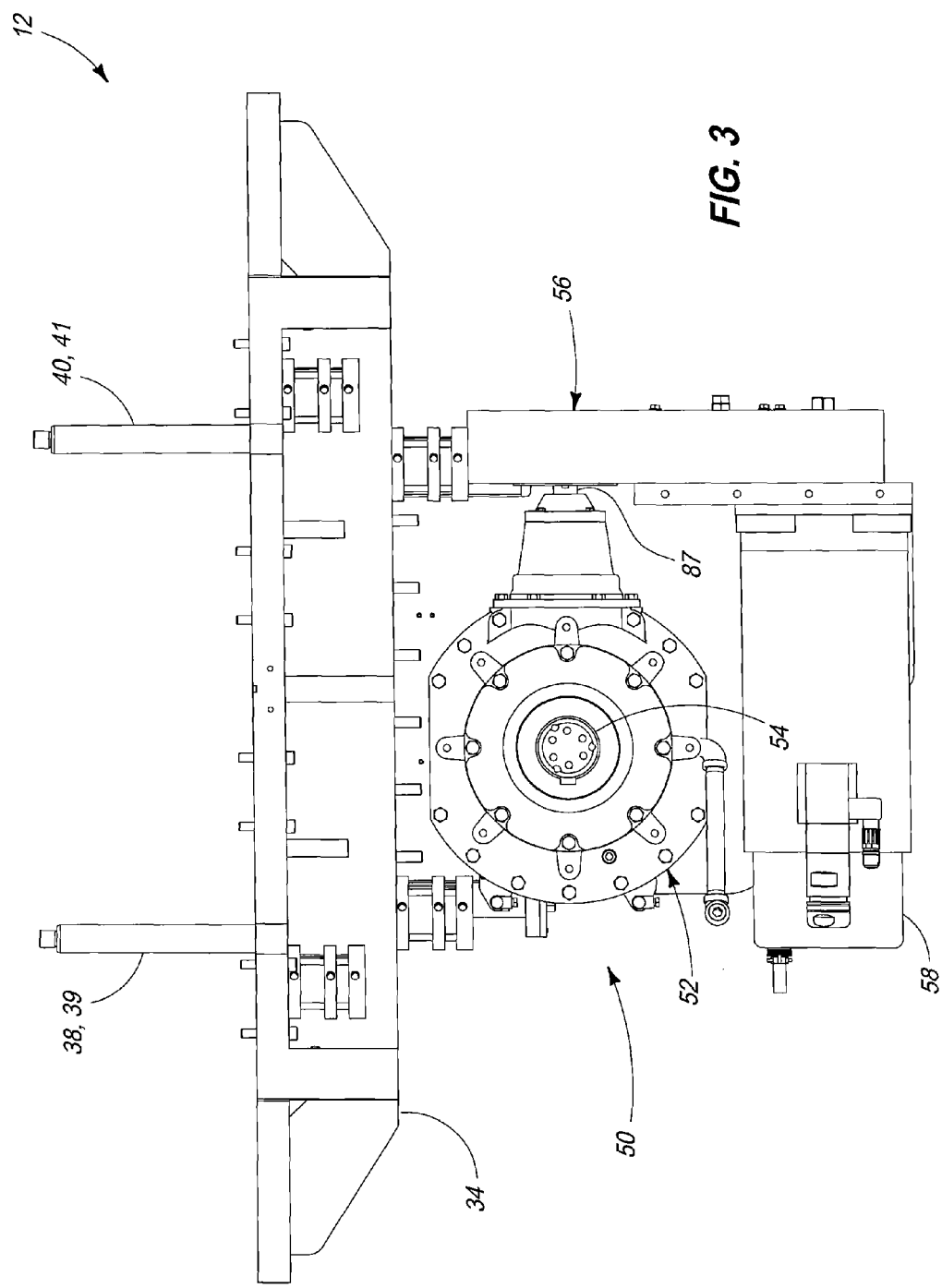
FIG. 3 is an elevational component side view of the third motion plug assist drive assembly of FIGS. 1-2 with a rack and pinion stroke assembly portion removed in order to show the drive gear box.

FIG. 3 shows orientation of drive source 50 on plug assist drive assembly 12 with a nearest drive assembly 48 (see FIG. 4) removed to show bevel gearbox 52. Servo motor 58 is configured to drive a transverse drive shaft 54 through a belt drive assembly 56, which causes pairs of drive shafts 38, 40 and 39, 41 to axially extend and retract relative to lower platen 34, as lower platen 34 is moved up and down, respectively. One suitable bevel gearbox 52 is a Hub City Model 950 bevel gear drive, having a 7.33:1 reduction ration with a 3.4375 bore, and sold by Hub City, Inc., Factory Sale, 2914 Industrial Ave., P.O. Box 1089, Aberdeen, S. Dak. 57402-1089. Optionally, other suitable types of gear drives and transfer cases can be used, as long as they impart a similar combination of speed and torque to drive assemblies 46 and 48 (see FIG. 1), such as worm gear drives, helical bevel drives, spur gear drives, or any other suitable mechanism for providing and converting a drive input to a driven output.

Figure 4:
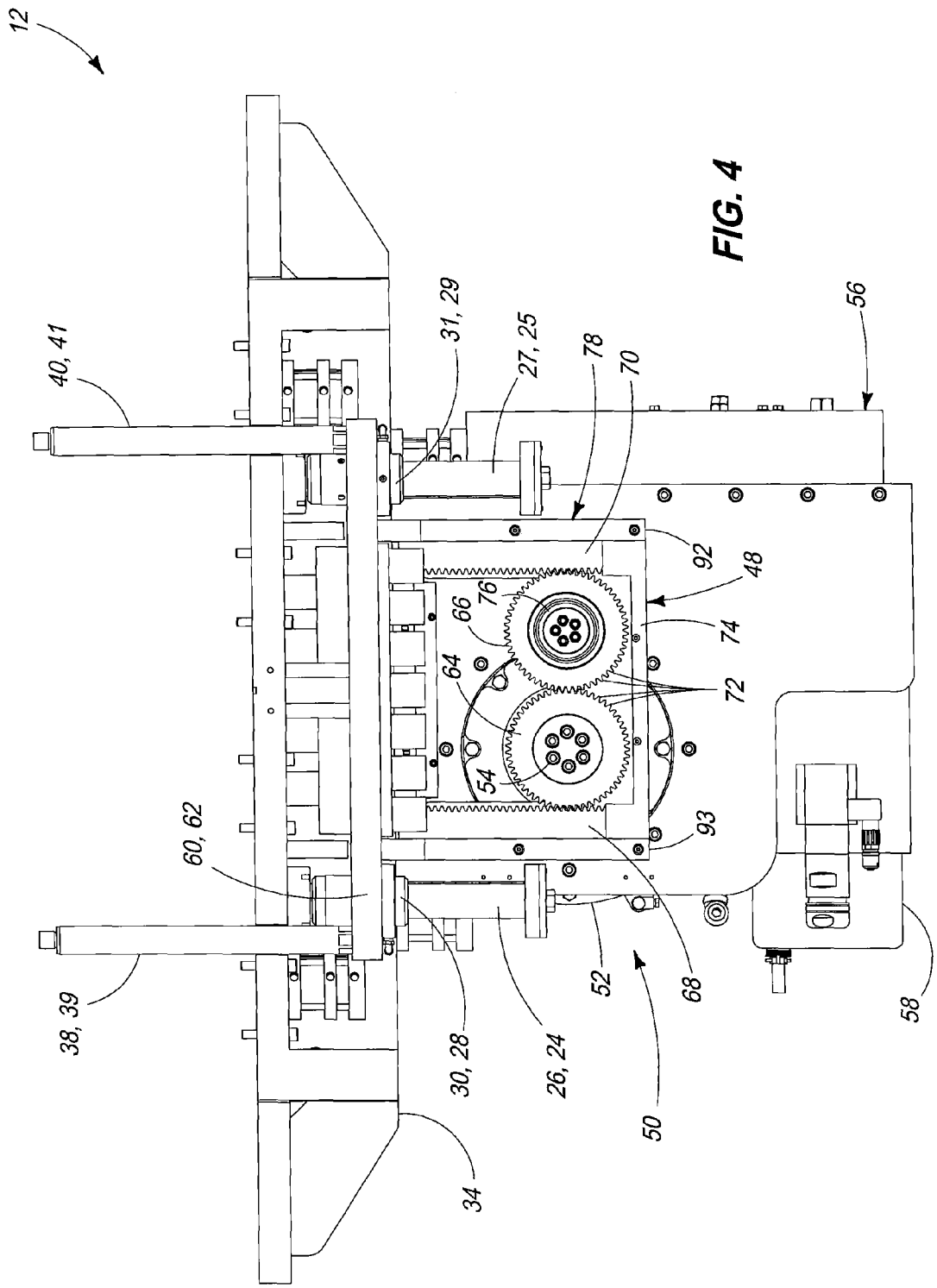
FIG. 4 is an elevational component end view with a cover removed from the rack and pinion assembly showing one rack and pinion stroke assembly.

FIG. 4 illustrates plug assist drive assembly 12 and corresponds with the view depicted in FIG. 3, but includes drive assembly 48. More particularly, drive assembly 48 (as well as drive assembly 46, see FIG. 5) of plug assist drive assembly 12 is driven by servo motor 58 through bevel gearbox 52 by rotating and counter-rotating shaft 54. Shaft 54 drives an intermeshing drive gear 64 and driven gear 66 in rotation and counter-rotation, raising and lowering linear gear racks 68 and 70, respectively. Linear gear racks 68 and 70 provide a first elongated gear rack and a second elongated gear rack, respectively. Likewise, drive assembly 46 (see FIG. 5) provides a third elongated gear rack and a fourth elongated gear rack in substantially identical mirror-image of the first elongated gear rack and the second elongated gear rack of drive assembly 48. Gear 64 is affixed onto drive shaft 54, while gear 66 is affixed onto idler shaft 76. Each of gears 64, 66 and gear racks 68, 70 have an array of individual gear teeth 72 configured to impart coaction with a respective gear.

Linear gear racks 68 and 70 are rigidly affixed together within a frame that is formed by bolting together a cross-frame member 74, side plates 92 and 94, and cross plate 60, as shown in FIG. 4. Linear gear racks 68 and 70 are then bolted to side plates 92 and 94 with a plurality of threaded fasteners. A cross plate 60 is then bolted to the top end of each plate 92 and 94 to form a rectangular frame, within which linear gear racks 68 and 70 are secured to plates 92 and 94. Drive assembly 46 (see FIGS. 1 and 5) is constructed in mirror-image and substantially identical to drive assembly 48, but on an opposite side of bevel gearbox 52. Cross plate 62 closes out a top end of drive assembly 46 atop similar side plates 90 and 91 (see FIG. 5). A cover plate is secured over the resulting frame on each drive assembly 46 and 48, such as cover plate 96 on drive assembly 48 (see FIG. 6) in order to form a housing 78 that protects the intermeshing gear teeth of gears 64 and 66, and linear gear racks 68 and 70.

Although drive assemblies 46 and 48 use a pair of linear racks 68 and 70 with teeth 72 facing one another, and gears 64 and 66 stacked there between, it is understood that other alternative configurations are possible. For example, one optional construction uses two cylindrical gears that are spaced apart and each configured to drive a respective linear rack, using one or more intermediate gears (or gearboxes) to drive the cylindrical gears in co-rotation or counter-rotation. Further optionally, the teeth on each linear gear rack can be configured to face away from each other, or face a common direction, with separate cylindrical drive gears driving each respective linear rack, using one or more intermediate gears (or gearboxes) to drive the cylindrical gears in co-rotation or counter-rotation. Further optionally, such linear gear racks can be arcuate or elongate racks that are mounted in such a way to drive a third motion platen in a linearly reciprocation movement, with separate die posts guiding each platen.

Figure 5:
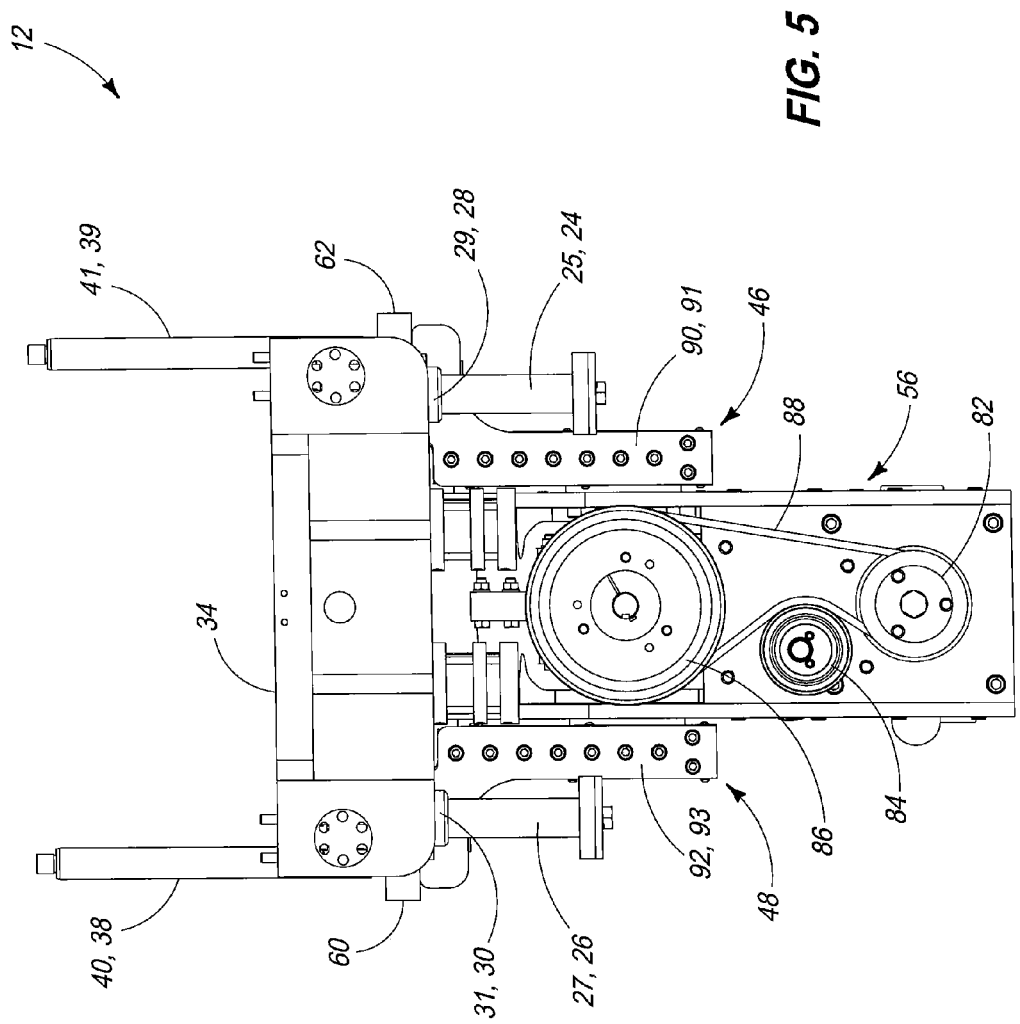
FIG. 5 is an end view of the third motion plug assist drive assembly of FIGS. 1-4.
Figure 6:
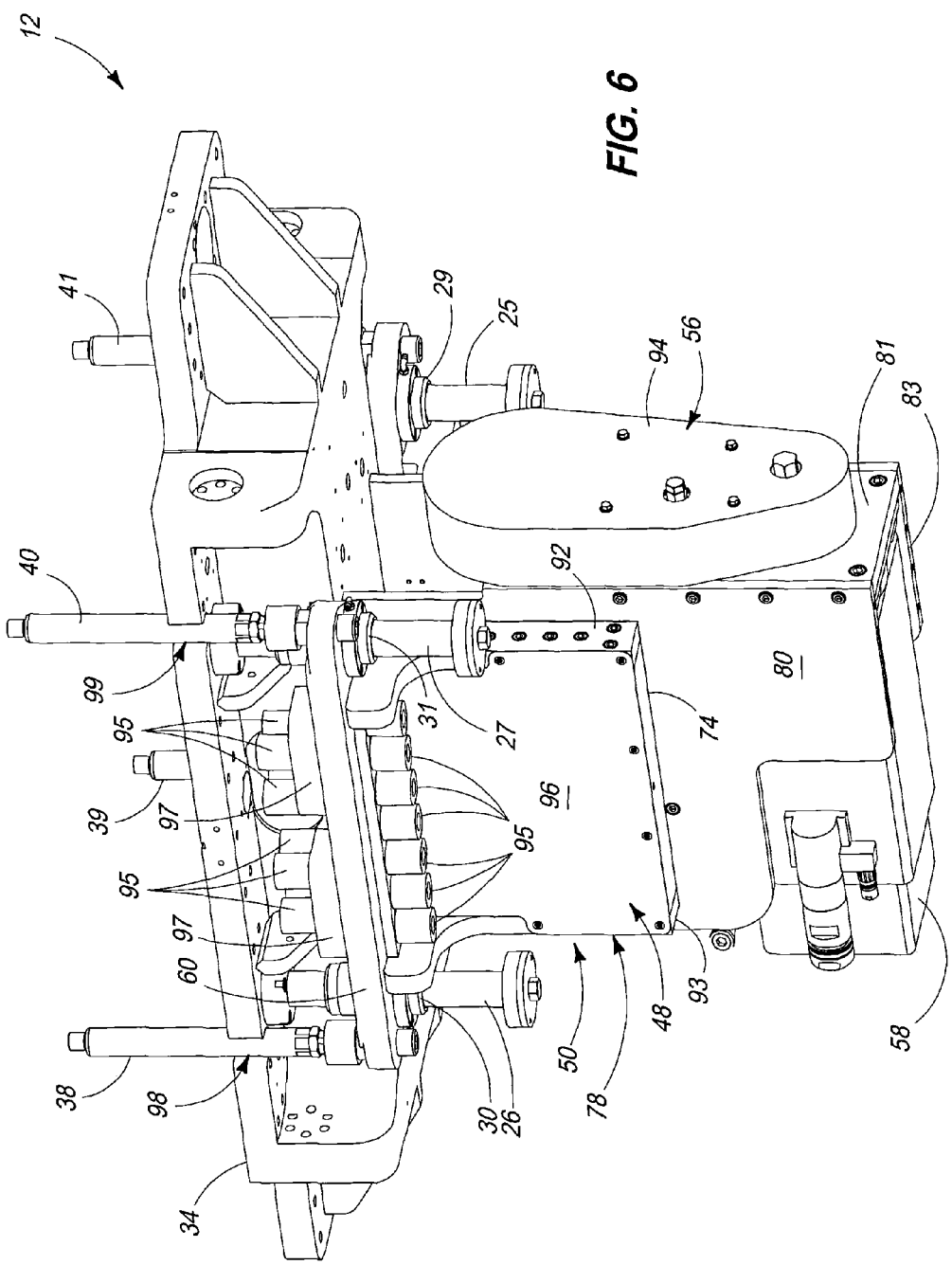
FIG. 6 is a perspective view from below of the third motion plug assist drive assembly of FIGS. 1-5.

In operation, servo motor 58 drives drive assemblies 46 (see FIG. 5) and 48 through belt drive assembly 56 and gearbox 52, as shown in FIGS. 4-6. Shaft 54 rotates and counter rotates in response to control signals being delivered from control system 100 (see FIG. 2), driving drive shafts 38-41 upward and downward relative to lower platen 34. Bronze bushings 28-31, each contained within a housing, mounted on cross plates 60 and 62 are axially reciprocated along die posts 24-27 to ensure accurate, guided reciprocation of third motion platen 36 and plugs 42 (see FIG. 2) relative to platen 34.

FIG. 5 further illustrates construction of belt drive assembly 56 with belt drive cover 94 (see FIG. 6) removed. More particularly, assembly 56 includes a drive pulley 82 that is driven by servo motor 58 (see FIG. 6), a driven pulley 86, and an idler, or tension pulley 84. Pulleys 82, 84 and 86 have teeth that intermesh with a toothed drive belt 88 to drive pulley 86, which is affixed onto an input shaft 87 (see FIG. 3) of bevel gearbox 52 (see FIG. 3) to drive assemblies 46 and 48 in up and down reciprocation.

FIG. 6 illustrates plug assist drive assembly (with third motion 36 and plugs 42 removed, see FIG. 2). More particularly, drive assembly cover plate, or panel 96 on drive assembly 48 is shown affixed to frame member 74 and side plates 92 and 93. Additionally, an array of urethane bumpers are each secured to each cross plate 60 and 62, such as bumpers 95 and 97 to prevent rigid impact of cross plates 60 and 62 (and respective housing 78, see FIG. 5) with a platen 34 as drive shafts 38-41 reciprocates through bores 98-99 in a top surface of platen 34.

As shown in FIG. 6, panels 80, 81 and 83 are rigidly secured to a bottom surface of platen 34, supporting servo motor 58 and gearbox 52, as shown in FIG. 6. In operation, housing 78 of drive assembly 48 moves up and down with cross plate 60 and rods 38, 40, relative to stationary plate 80 and platen 34.

A linear array of third motion platen urethane bumpers 95 are each fixed with a central threaded, recessed bolt to a bottom surface of each cross plate, such as cross plate 60. Similarly, two arrays of bumpers 95 are affixed atop a riser base 97 that is secured to a top surface of each cross plate, such as cross plate 60. Each bumper 95 has a central through-bore with an end recess for receiving an enlarged head of a respective threaded bolt for securing bumper 95 to either cross plate 60 or riser base 97. Each bumper 95 is constructed from a resilient material capable of providing shock absorption, such as urethane. Alternatively, any shock absorbing material can be utilized, such as rubber, synthetic rubber, or other suitable structural material having elastic rebound capabilities. Bumpers 95 atop each cross plate 60 and 62 absorb impacts with a bottom surface of platen 34 during each up and down cycle of operation. Likewise, bumpers 95 below each cross plate 60 and 62 absorb impacts with components of the kinematic drive linkage 19 (see FIG. 1).

As shown in FIGS. 1-6, gearbox 52 is provided in a medial position, between drive assemblies 46 and 48. The linear racks, such as racks 68 and 70 on drive assembly 48, form a rectangular array of racks inside of which gearbox 52 is provided. Such configuration is very compact and provides a desirable combination of speed and torque when driving plugs 42 upwardly into a heated thermoformable web during an article forming operation. Such a construction provides for structural integrity under substantial cyclical forming loads at each of four corners on a platen, and retains structural orientation even for situations where a material "jam-up" of misformed web and articles occurs between plugs 42 and female cavities 44, causing structural overloads to the plug assist drive assembly 12.

Figure 7:
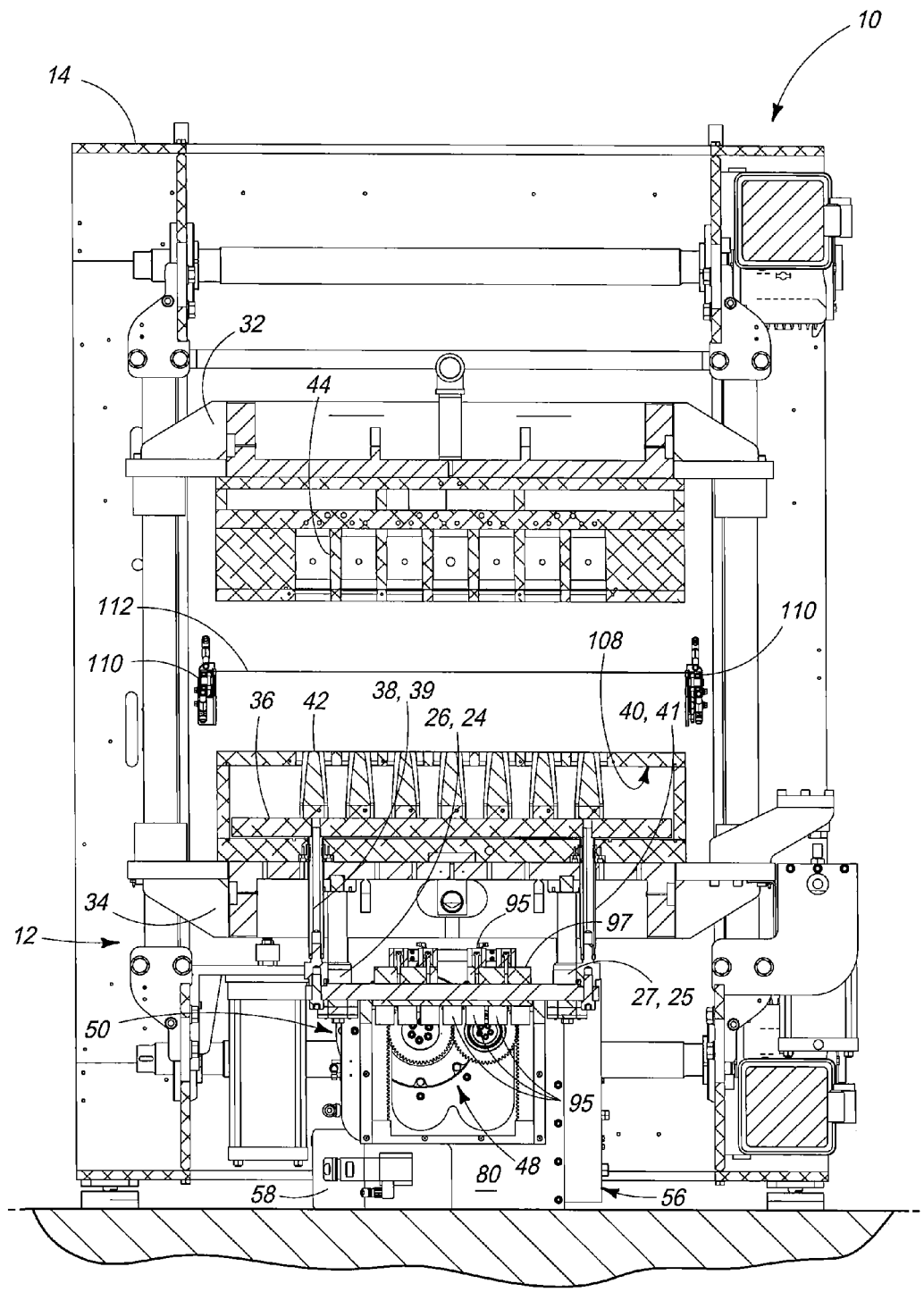
FIG. 7 is vertical sectional view corresponding with that shown in FIG. 2, but showing the drive platen and plug assist platen retracted to a lowermost position and the upper platen elevated to a top-most position.

FIGS. 7-10 illustrate progressive stages of operation for a thermoforming machine 10 having a plug assist drive assembly 12 with a moving third motion platen 36 shown in the same cross-sectional view as FIG. 2 taken in FIG. 1. Additionally, a chain rail conveyor 110 is shown supporting a heated web 112 of thermoformable material for forming between plugs 42 and female dies 44. FIG. 7 shows the drive platen 34 and plug assist platen 36 retracted to a lowest-most position, and the upper platen 32 retracted to a highest-most position corresponding with a position at the beginning of a new thermoforming cycle. More particularly, a heated web of thermoformable material (not shown) is intermittently conveyed in a gap between platens 32 and 34 using a conveyor (not shown). Platens 32 and 34 are subsequently driven together and apart relative to such web in order to drive plugs 42 and cavities 44 together and apart, forming articles in such web. Web 112 is conveyed along a web travel path away from between platens 32 and 34 after being formed via the steps depicted in FIGS. 7-10. Pursuant to the steps depicted in FIGS. 8-10, third motion platen 36 is subsequently driven upwardly after lower platen 34 has been raised toward a heated web.

Figure 8:
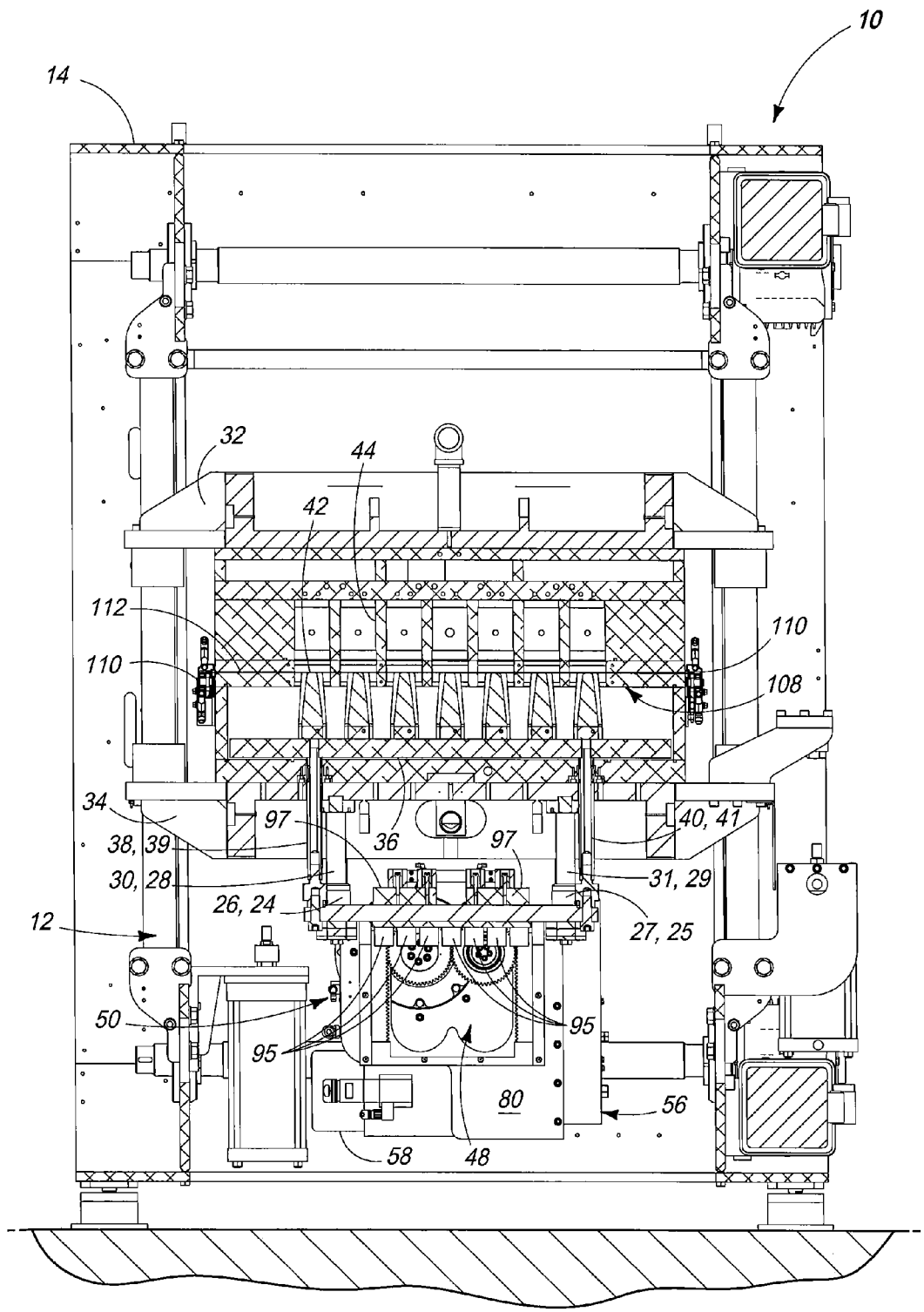
FIG. 8 is a vertical sectional view corresponding with that shown in FIG. 7, but later in time and showing the drive platen raised into engagement with the lowered upper platen, with the plug assist platen still retracted to a lowest-most position.

As shown in FIGS. 7-10, lower platen 34 is first raised into contact with a web 112 while upper platen 32 is lowered into contact with web 112 to arrive at the platen positions shown in FIG. 8. Subsequently, third motion platen 36 is driven upwardly from the starting position shown in FIG. 9 to the final fully raised position shown in FIG. 10. Optionally, third motion platen 36 can be moved at the same time lower platen 34 is being raised, thereby further increasing the speed with which plugs 42 are driven upwardly into a heated web 112.

Plug assist drive assembly 12 uses servo drive motor 12 in combination with belt drive assembly 56, bevel gearbox 52 (see FIGS. 3-4), and drive assemblies 46 and 48 (see FIGS. 1 and 5) in order to drive plugs 42 upwardly with a combination of speed and force (or torque) previously not attainable. It is important to drive plugs 42 upwardly with both speed and torque in order to impart an improved finish to thermoformed articles. If web 112 is heated too much, it has been discovered that undesirable article surface blemishes can be imparted to clear plastic articles as they are formed. In order to reduce or eliminate these blemishes, it is desirable to form web 112 at relatively cooler temperatures. However, cooler temperatures, in combination with cooling of web 112 when plugs 42 contact web 112, causes a need for increased forming pressures (torque at the drive motor) in order to form articles in web 112. If the forming operation is slowed down, producing a slower plug speed, web 112 is further cooled by contact with each plug 42, causing further forming difficulties and even greater forming pressures. By increasing upward speed of plugs 42, web 112 can be formed at relatively lower temperatures, as there is less time for heat to dissipate from web 112 into local contact with plugs 42. Even though cooler temperatures entail greater forming forces, plug assist drive assembly 12 is capable of realizing these forces with concomitant speed. Secondly, it has been found that increased forming speeds, made possibly through gearbox 52 and drive assemblies 48 and 48, improves the manner in which web 112 is drawn up by each plug 42 into each female cavity 44, reducing undesirable article surface blemishes, such as lines in the resulting formed article, as increased speeds provide less time for the web to cool during the forming operation.

Drive assemblies 46 (see FIG. 1) and 48 cooperate with bevel gearbox 52 (see FIG. 3) to move plugs 42 into a bottom surface of the heated web 112 at a high rate in combination with large forces (high forming pressures), thereby improving article formation by speeding up the forming process. Such increase in speed is important as contact between each plug 42 and a heated web causes cooling of the web, which otherwise increases forces needed to drive platen 34 in an upward direction. Accordingly, platen 36 increases the upward speed of plugs 42 in order to speed forming of articles, which mitigates cooling of the web as it contacts each plug 42. In operation, drive source 50 imparts up and down movement of platen 36 relative to platen 34 via drive assembly 48 (and drive assembly 46, see FIG. 1) through controlled operation of servo drive 48, belt drive assembly 56, and gearbox 52 (see FIGS. 3-4 and 6).

FIG. 8 is a vertical sectional view corresponding with that shown in FIG. 7, but later in time and showing the lower drive platen 34 raised into engagement with the web 112, while the upper platen is lowered onto web 112. Plug assist platen 36 is shown at a lowest position, prior to being raised to drive plugs into web 112.

Figure 9:
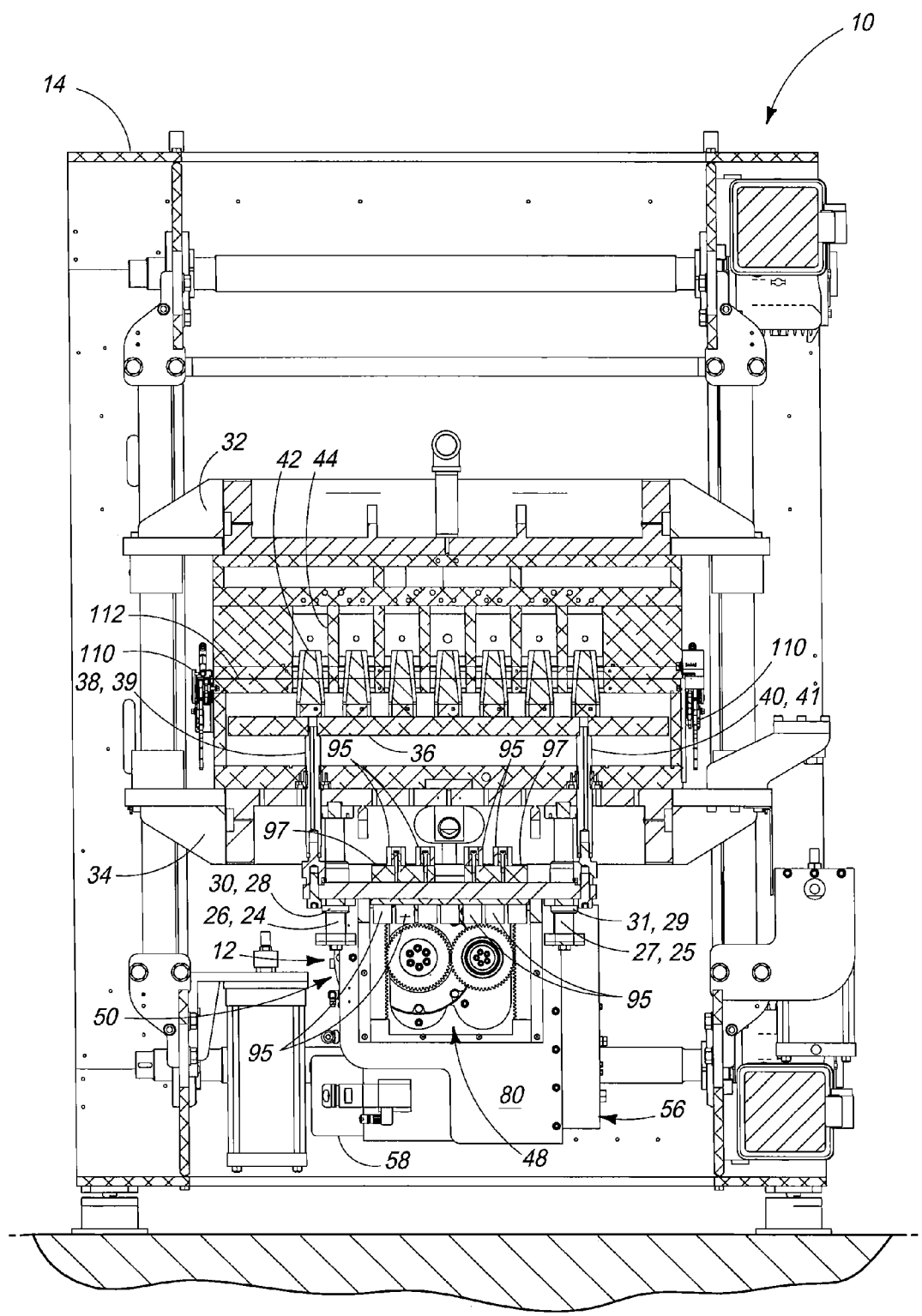
FIG. 9 is a vertical sectional view corresponding with that shown in FIG. 8, but later in time and showing the drive platen raised into engagement with the lowered upper platen, with the plug assist platen being raised and approaching a topmost position.

FIG. 9 is a vertical sectional view corresponding with that shown in FIG. 8, but later in time and showing the drive platen raised into engagement with web 112, upper platen 32 lowered into engagement with web 112, and plug assist platen 36 being raised and shown in a mid position.

Figure 10:
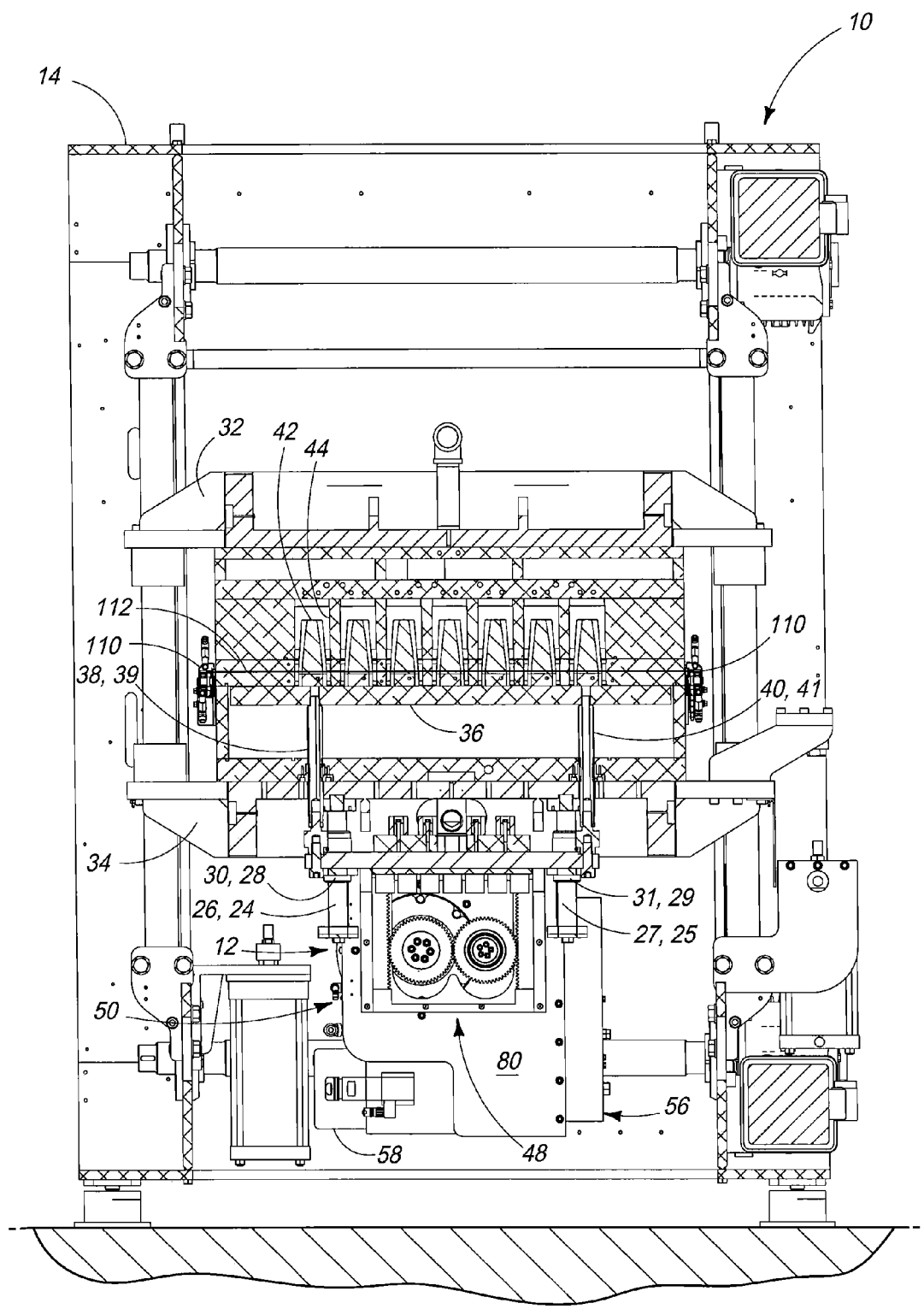
FIG. 10 is vertical sectional view corresponding with that shown in FIG. 9, but later in time and showing the drive platen raised into engagement with the lowered upper platen, with the plug assist platen fully raised to a top-most position.

FIG. 10 is vertical sectional view corresponding with that shown in FIG. 9, but later in time and showing bottom platen 34 raised into engagement with web 112, upper platen 32 lowered into engagement with web 112, and plug assist platen 36 raised to a topmost position, thereby fully forming articles in web 112. After the step depicted in FIG. 10, platen 32 is raised and platens 34 and 36 are lowered, as the process proceeds back to the step depicted in FIG. 7 to continue the cyclical forming operation.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. A plug assist drive assembly for a thermoforming press, comprising:
    a drive platen;
    a plug assist platen having at least one plug;
    a first elongated gear rack and a second elongated gear rack each carried by the plug assist platen in a longitudinally extending and substantially parallel, spaced apart relation with a plurality of rack teeth extending on each gear rack between proximal and distal ends;
    a first gear carried by the drive platen and operably communicating with the first elongated gear rack;
    a second gear carried by the drive platen and operably communicating with the second elongated gear rack and the first gear;

a drive source operably communicating with one of the first gear and the second gear to drive the assist platen in concurrent reciprocating motion relative to the drive platen; and a control system having a controller comprising processing circuitry and memory configured to precisely regulate motion of the drive platen and the assist platen in desired, timed synchronization such that the at least one plug is driven upwardly with desired synchronized speed and force relative to the drive platen in at least one of: a) concurrent motion; and b) sequential motion between the drive platen and the plug assist platen.

2. The plug assist drive assembly of claim 1, wherein the first elongated gear rack, the second elongated gear rack, the first gear and the second gear are provided in a common plane extending parallel to an axis of reciprocation for the plug assist platen.

3. The plug assist drive assembly of claim 1, wherein the rack teeth on the first elongated gear rack are configured to face the rack teeth on the second elongated gear rack.

4. The plug assist drive assembly of claim 3, wherein the first gear is a pinion drive gear and the second gear is a pinion driven gear coupled with the pinion drive gear.

5. The plug assist drive assembly of claim 1, wherein the drive source comprises a servo motor coupled with the first gear through a drive shaft.

6. The plug assist drive assembly of claim 5, wherein the drive source further comprises a gearbox interposed between the servo motor and the first gear, the gearbox providing the drive shaft.

7. The plug assist drive assembly of claim 1, wherein the plug assist platen is mounted relative to the drive platen for straight line reciprocating motion.

8. The plug assist drive assembly of claim 1, further comprising at least one die post mounted to one of the drive platen and the plug assist platen, and a complementary bushing operably communicating with the die post for linear reciprocation there along and mounted to another of the drive platen and the plug assist platen.

9. The plug assist drive assembly of claim 1, wherein the first and second elongated gear racks each comprise a linear gear rack.

10. The plug assist drive assembly of claim 1, further comprising a third elongated gear rack and a fourth elongated gear rack carried by the plug assist platen in longitudinally extending and substantially parallel, spaced apart relation with a plurality of rack teeth extending on each gear rack between proximal and distal ends with rack teeth on each respective gear rack facing one another, another first gear carried by the drive platen and operably communicating with the third elongated gear rack, and another second gear carried by the drive platen and operably communicating with the fourth elongated gear rack and the another first gear, the first and second elongated gear racks spaced apart from the second and third gear racks, and a first drive shaft coupling together the one first gear with the another first gear and a second drive shaft coupling together the one second gear and the another second gear.

11. The plug assist drive assembly of claim 1, wherein the drive source operably drives the assist platen in linearly reciprocating motion.

12. A thermoforming machine, comprising:
a frame;
a first platen supported by the frame and operative to carry a female die;
a second platen supported by the frame for movement to and fro relative to the first platen;

a plug assist platen carried relative to the second platen and operative to carry a plug for complementary interaction with the female die;

a first elongated gear rack and a second elongated gear rack each carried by the plug assist platen in a longitudinally extending and substantially parallel, spaced apart relation with a plurality of rack teeth extending on each gear rack between proximal and distal ends;

a first gear carried by the drive platen and operably communicating with the first elongated gear rack;

a second gear carried by the drive platen and operably communicating with the second elongated gear rack and the first gear;

a drive source carried by the second platen and operably communicating with one of the first gear and the second gear to drive the assist platen in reciprocating motion relative to the drive platen; and a control system having a controller comprising processing circuitry and memory configured to precisely regulate motion of the drive platen and the assist platen in desired, timed synchronization such that a plug on the plug assist platen is driven upwardly with desired synchronized speed and force relative to the drive platen in at least one of: a) concurrent motion; and b) sequential motion between the drive platen and the plug assist platen.

13. The thermoforming machine of claim 12, further comprising a third elongated gear rack and a fourth elongated gear rack carried by the plug assist platen in longitudinally extending and substantially parallel, spaced apart relation with a plurality of rack teeth extending on each gear rack between proximal and distal ends with rack teeth on each respective gear rack facing one another, another first gear carried by the drive platen and operably communicating with the third elongated gear rack, and another second gear carried by the drive platen and operably communicating with the fourth elongated gear rack and the drive gear, the first and second elongated gear racks spaced apart from the second and third gear racks, and a first drive shaft coupling together the one first gear with the another first gear and a second drive shaft coupling together the one second gear and the another second gear.

14. The thermoforming machine of claim 12, wherein the rack teeth on the first elongated gear rack are configured to face the rack teeth on the second elongated gear rack.

15. The thermoforming machine of claim 12, wherein the first gear is a pinion drive gear, and the second gear is a pinion driven gear coupled for co-rotation with the pinion drive gear.

16. The thermoforming machine of claim 15, wherein the first elongated gear rack comprises a linear array of gear teeth and the second elongated gear rack comprises a linear array of gear teeth arranged in opposing face relation with the linear array of gear teeth on the first elongated gear rack.

17. The thermoforming machine of claim 16, wherein the pinion drive gear and the pinion driven gear are interposed in gear-meshed relation between the first elongated gear rack and the second elongated gear rack.

18. The thermoforming machine of claim 12, wherein the drive source comprises a bevel gearbox having an input shaft and an output shaft, the output shaft configured to drive the one of the first gear and the second gear.

19. The thermoforming machine of claim 18, wherein the drive source further comprises a servo motor and a belt drive assembly coupled between the servo motor and the input shaft of the bevel gearbox.

20. The thermoforming machine of claim 12, wherein the drive source is configured to drive the assist platen in linearly reciprocating motion.

21. The thermoforming machine of claim 12, wherein the first platen is supported by the frame for movement relative to the second platen, and further comprising a first servo motor configured to drive the first platen, a second servo motor configured to drive the second platen, a third servo motor configured to drive the plug assist platen, and a controller communicating with the first servo motor, the second servo motor, and the third servo motor for activation in timed synchronization.

* * * * *